Figure 1:
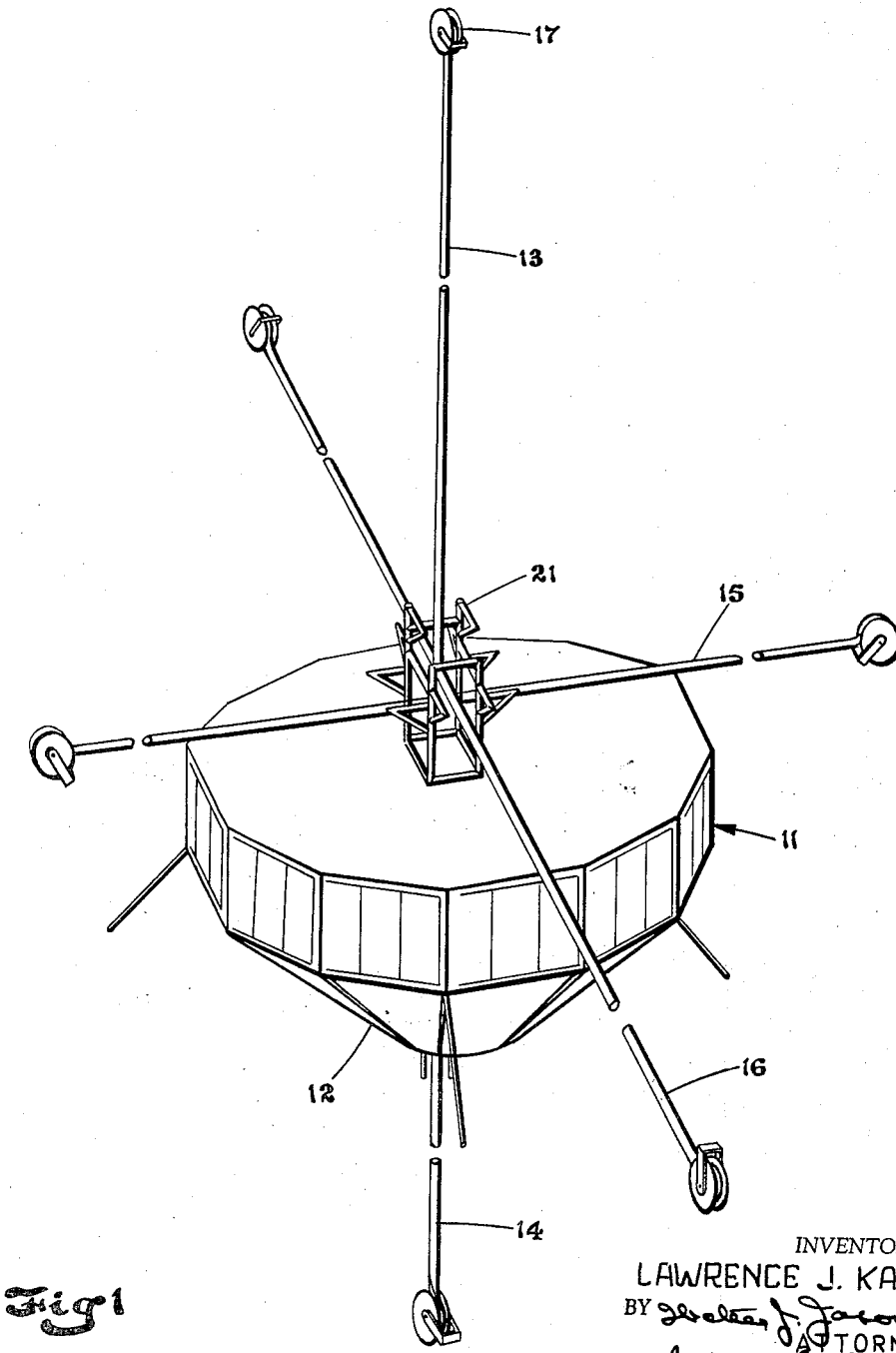

INVENTOR.
LAWRENCE J. KAMM

Feb. 2, 1965 L. J. KAMM 3,168,263
GRAVITY GRADIENT SATELLITE ORIENTATION SYSTEM
Filed Nov. 20, 1961 4 Sheets-Sheet 4

INVENTOR.
LAWRENCE J. KAMM

United States Patent Office 3,168,263
Patented Feb. 2, 1965

3,168,263
GRAVITY GRADIENT SATELLITE
ORIENTATION SYSTEM
Lawrence J. Kamm, San Diego, Calif., assignor to General Dynamics Corporation, San Diego, Calif., a corporation of Delaware
Filed Nov. 20, 1961, Ser. No. 153,329
9 Claims. (Cl. 244—1)

This invention relates to artificial satellites, and more particularly, to means for stabilizing and maintaining the attitude of such satellites in relation to the primary.

Artificial satellites deployed in orbits about the earth for observation of the earth's surface, or carrying directive antennas for use as communications repeaters, must be oriented with respect to the earth to function effectively. Previously proposed satellite orientation apparatus have relied upon reaction jets, or rotating fly-wheels to rotate the satellite into the desired orientation in response to a sensing device. Sensing devices have included electromagnetic radiation sensitive devices for sensing the position of the horizon circle of the primary as seen from the satellite, or gyroscopic devices for determining the gravity vertical of the primary. As will be apparent, the effective life of reaction jet orientation systems is limited by the amount of jet fuel carried aboard the satellite, as well as by the rate of expenditure of fuel required by stabilization of satellite perturbations. It will be apparent also that three mutually perpendicular rotatable fly-wheels and a suitable power source are required aboard satellites oriented by applying torque to revolve an internal wheel. Such fly-wheel arrangements are inherently heavy, and consume a great deal of the limited power available aboard a satellite.

In contrast to such prior art devices, the satellite orientation device of the present invention employs the force generated by the gravity gradient between the ends of an elongated body. In accordance with the present invention, an elongated, thin walled rigid tube extends from the satellite body. Two shorter mutually perpendicular thin-walled, rigid tubes and associated damping means are provided to damp oscillations. The satellite orientation device of the present invention, therefore, is self-contained, does not require a source of power aboard the satellite, is reliable, and is simple and inexpensive to fabricate.

To facilitate injection of an artificial satellite into orbit about its primary by rocket from the primary, with attendant forces due to oscillation and vibration, means are provided for storing the elongated tubes in a compact, rolled, or furled condition during launch, and for deploying the elongated tubes when in orbit.

It is, therefore, an object of this invention to provide satellite orientation means.

Another object of this invention is to provide satellite orientation means not requiring an external source of power.

Another object of this invention is to provide satellite orientation by means of the gravity gradient between the ends of an elongated body.

Another object of this invention is to provide an elongated body for satellite orientation which may be compactly stowed for launching and deployed in orbit.

Another object of this invention is to provide oscillation damping means for a gravity gradient satellite orientation device.

Another object of this invention is to provide a satellite orientation device not requiring a power source, which is simple and inexpensive to build; is light and compact during launching, and is highly reliable.

Figure 2:
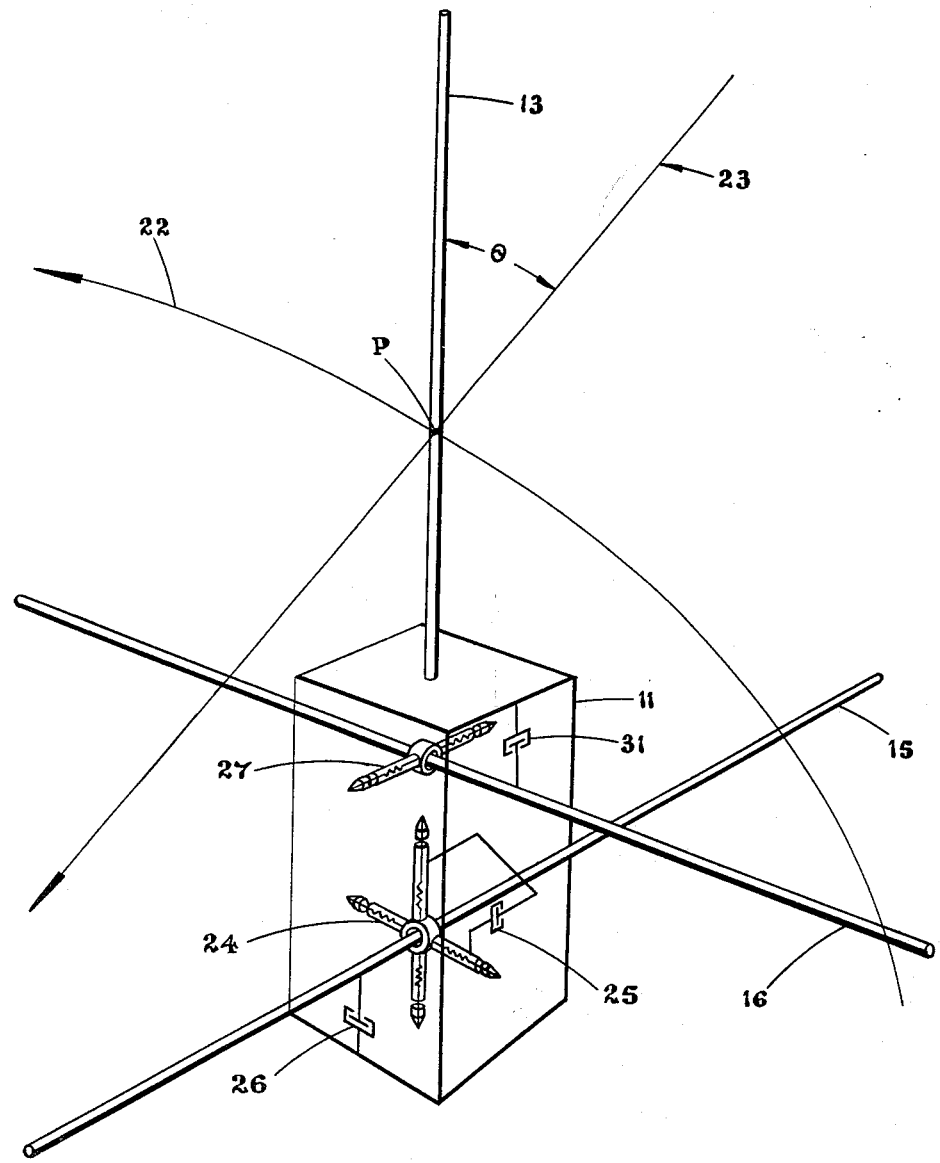
Figure 3:
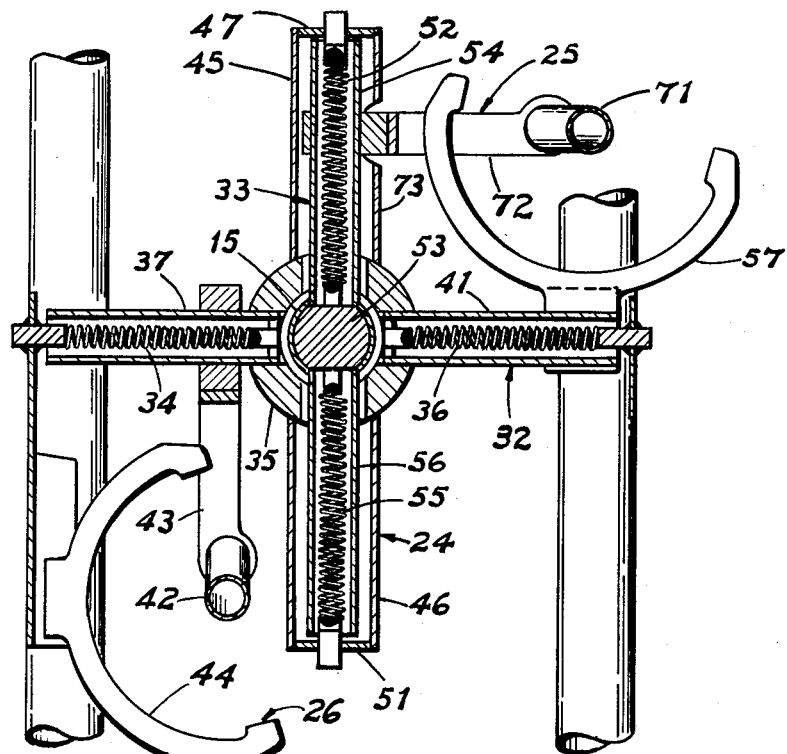
Figure 4:
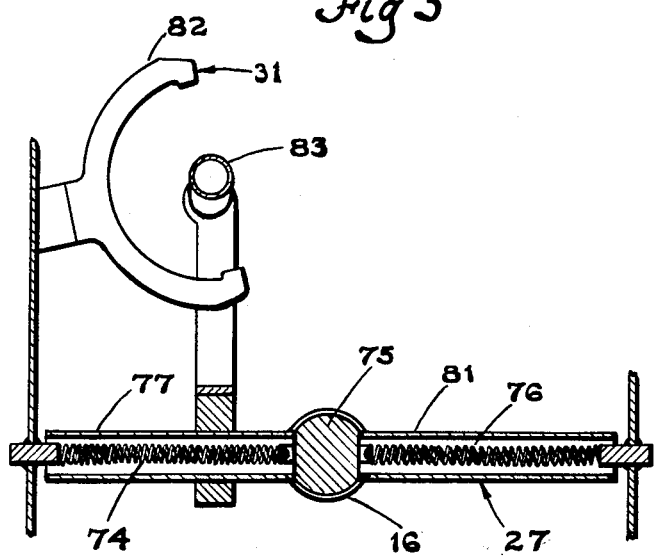
Figure 5:
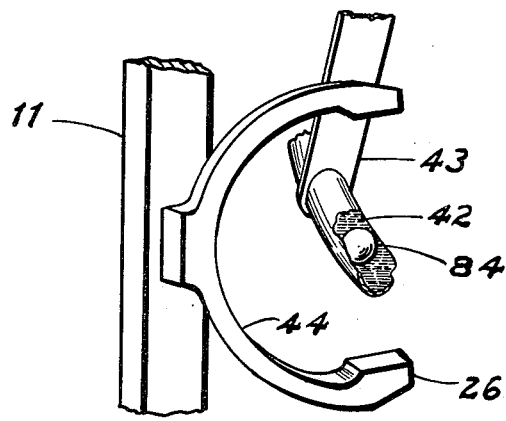
Figure 6:
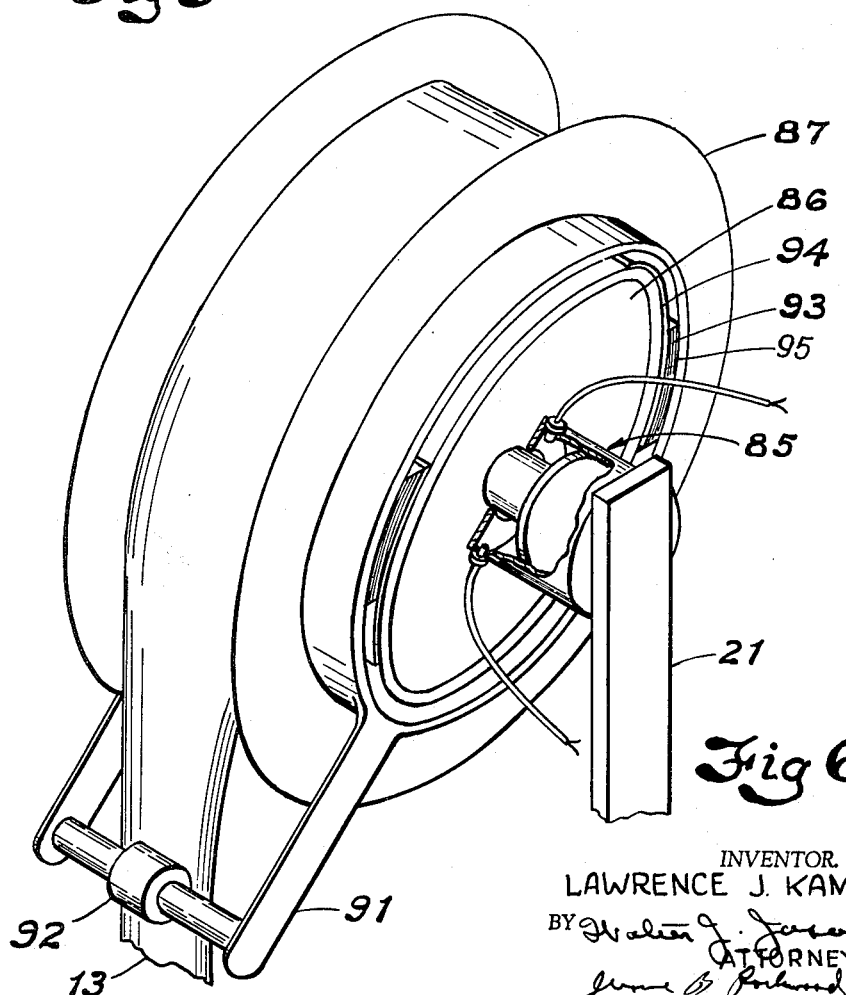

Other objects and advantages of the satellite orientation device of the present invention will become apparent from the following specification and appended drawings, wherein:

FIGURE 1 illustrates a typical satellite vehicle incorporating the present invention;
FIGURE 2 schematically illustrates the mode of operation of the present invention;
FIGURE 3 illustrates a flexure pivot and damper assembly having two degrees of freedom;
FIGURE 4 illustrates a flexure pivot and damper assembly having one degree of freedom;
FIGURE 5 illustrates a typical damper tube assembly, and
FIGURE 6 illustrates a furling spool assembly employed to deploy the orientation and stabilizer tubes.

Referring now to FIGURE 1, a typical artificial satellite vehicle 11 is illustrated having a surface 12 which is required to face the primary about which the satellite orbits. An elongated upper primary bar 13 and an elongated lower primary bar 14, rigidly fixed to satellite 11, provide an erecting force due to the primary's gravity gradient between the two elongated bars, as will be further disclosed hereinbelow. A first damper bar 15, having two degrees of freedom in planes tangent and perpendicular to the orbit and provided with viscous dampers, aligns itself perpendicular to the orbital plane, and a second damper bar 16, longer than damper bar 15, but shorter than primary bars 13 and 14, having one degree of freedom in the plane perpendicular to the orbit and provided with a viscous damper, aligns itself in a plane parallel with the orbital plane. Damper bars 15 and 16 serve to damp perturbations disturbing the alignment of the satellite, as will be discussed further hereinbelow.

Each of bars 13, 14, 15 and 16 comprise a thin-walled tube fabricated of a suitable springly material, such as spring steel, beryllium copper, or a plastic impregnated glass cloth, pre-formed about a cylindrical mandrel, and slit. The slit tube is flattened and rolled up on a suitable reel, such as reel 17 in FIGURES 1 and 6. Rolling up the slit tube stresses the tube material and stores energy therein, in a manner similar to the energy stored in a distorted spring. Suitable brackets 21 are provided to support the reels 17 during launch. The energy stored in the rolled up, flattened tube tends to unreel the tube. Exemplarity upon establishment of the satellite vehicle in orbit, reel 17 is released by bracket 21 and tube 13 unrolls itself. Due to the small forces involved, as disclosed hereinbelow, the extended tubes may be considered to be rigid bars, effectively.

Referring now to FIGURE 2, a satellite 11 having a single primary erecting bar 13 and stabilizer bars 15 and 16 is schematically illustrated following an orbital path 22. The center of mass of the satellite body 11 and elongated bar 13 is at point P. The local vertical 23 is the gravitational line of force joining center of mass P of the satellite with the center of mass of the primary (not shown). As will be noted in FIGURE 2, a perturbation has tilted the satellite vehicle to an angle $\theta$ from the desired vertical orientation. Assuming that the satellite vehicle is in a circular orbit about a spherical primary, the torque acting upon the vehicle may be expressed as $$T = \frac{K}{t^2}$$

$\{(\vec{i}T) \times \vec{i}\}$ in kgm.² sec.⁻², where T is the tensor of inertia of the complete body in kgm.², $\vec{i}$ is the unit vector along the local vertical 23, and $t$ is the revolution period of the orbiting vehicle in seconds. Thus, assuming a 150 pound satellite vehicle in an orbit of 200 nautical mile altitude above the earth, having a primary bar 13 with a length of 150 feet and weighing 1.25 pounds, an erecting torque of 560 dyne centimeters per degree θ of displacement is provided.

It will be apparent that unless damping is provided, the erecting force will overshoot the vertical and cause the satellite vehicle to oscillate as a pendulum. Damping is provided by damping bars 15 and 16. Damping bar 15 is provided with a flexure pivot 24, allowing motion in two planes, one parallel to bar 13, the other perpendicular thereto. Viscous dampers 25 and 26 serve to damp oscillations between bar 15 and satellite vehicle 11. Damper bar 16 is provided with a flexure pivot 27 allowing motion in a plane parallel to bar 13 and perpendicular to damping bar 15 in its normal position. Viscous damper 31 serves to damp oscillations between damper bar 16 and satellite vehicle 11.

In the erected, stable equilibrium state in orbit, damper bar 16, approximately 25 percent longer than damper bar 15, aligns itself in the plane of the orbit, and shorter damper bar 15 aligns itself in a line perpendicular to the orbital plane. Such alignment is the result of various perturbing forces, and two damping bars of dissimilar length are employed to stabilize the satellite vehicle in the presence of perturbing forces. Such perturbing forces include drag forces due to the impingement of neutral air molecules and atoms, charged drag and inductive drag due to a negative charge resulting from the larger flux of incident electrons as compared to the ion flux on the surface of the bars and the E.M.F. generated by the elongated conductive bars cutting the lines of force of a magnetic field, as that of the earth. In higher orbits, as a 24 hour earth orbit, the foregoing perturbing forces become negligible. However, other perturbing forces become significant, such as solar radiation, solar wind, and impingement of micrometeorites. Thus, primary orienting bar 13 and damping bars 15 and 16, in combination, serve to orient the satellite vehicle toward the local vertical and in the plane of the orbit despite perturbing forces.

Flexure pivots are employed between damping bars 15 and 16 and the satellite vehicle 11, thereby avoiding unpredictable friction and sticking forces. Referring now to FIGURE 3, an embodiment of two degrees of freedom flexure pivot 24 connecting damping bar 15 to the frame of satellite vehicle 11 is illustrated. Two degrees of freedom flexure pivot 24 includes a first pivot assembly 32 and a second pivot assembly 33. Pivot assembly 32 comprises a first helical spring 34 suitably fastened to the frame of satellite vehicle 11 at one end, and to a gimbal ring 35 at the other, and a second helical spring 36 also having one end connected to the frame of satellite vehicle 11, and the other end to gimbal ring 35 on the side opposite spring 34. A tube 37 covers helical spring 34 and is fixed to gimbal ring 35. Similarly, tube 41 covers helical spring 36 and is fixed to gimbal ring 35. Damping capsule 42, fixed to, and rotating with pivot cover tube 37 with respect to the frame of satellite vehicle 11 by means of bracket 43, cooperates with permanent magnet 44, fixed to the frame of satellite vehicle 11, as disclosed hereinbelow in connection with FIGURE 5.

Pivot assembly 33 enables freedom of movement of damping bar 15 in a plane parallel to the top and bottom edges of FIGURE 3. Pivot assembly 33 comprises a first outer tube 45 and a second outer tube 46 welded, brazed or otherwise fixed to gimbal ring 35. The ends of tubes 45 and 46 remote from gimbal ring 35 are closed by rigidly attached end caps 47 and 51, respectively. A first helical spring 52 is fixed at one end to end cap 47, and at the other end to a semi-spherical block 53. Bar 15 is rigidly secured to semi-spherical block 53. An inner tube 54 surrounding helical spring 52 is suitably rigidly secured to semi-spherical block 53 at one end, and is open at the end adjacent end cap 47. In a similar manner, a helical spring 55 is fastened to end cap 51 at one end, and to semi-spherical block 53 at the other. Inner tube 56, surrounding helical spring 55, is rigidly secured to semi-spherical block 53 at one end, and is open at the other.

Damping assembly 25 is associated with pivot assembly 33. Damping assembly 25 comprises a permanent magnet 57 rigidly secured to tube 41, and damping capsule 71, rigidly secured by bracket 72 to move with inner tube 54. An aperture 73 in outer tube 45 allows clearance for bracket 72.

One degree of freedom flexure pivot 27, illustrated in FIGURE 4, is substantially similar in structure and function to pivot assembly 32 of two degrees of freedom pivot 24. Thus, flexure pivot 27 comprises a first helical spring 74 suitably fastened at one end to the frame of satellite vehicle 11, and to a semi-cylindrical block 75 at the other, and a second helical spring 76 also having one end connected to the frame of the satellite vehicle and the other end to semi-cylindrical block 75 on the side opposite helical spring 74. Tubes 77 and 81 have one end rigidly fastened to semi-cylindrical block 75. The center of damper bar 16 is also rigidly fastened to semi-cylindrical block 75. Viscous damping assembly 31 comprises a permanent magnet 82 rigidly fastened to the frame of satellite vehicle 11, and the cooperating damping capsule 83, rigidly secured to tube 77.

A typical damping assembly, exemplarily, damping assembly 26, is illustrated in FIGURE 5. As disclosed hereinabove, damping capsule 42 is secured to tube 37 of pivot assembly 32 by bracket 43. Damping capsule 42, fabricated of a suitable non-magnetic material, is filled with a viscous fluid having low thixotropy. Also enclosed within damping capsule 42 is a ferro-magnetic sphere 84, having a diameter slightly less than the internal diameter of damping capsule 42. Relative motion between damper bar 15 and satellite vehicle 11 in the plane of primary erecting bar 13 moves damping capsule 42 between the poles of magnet 44. Since the body of damping capsule 42 is non-magnetic, ferro-magnetic sphere 84 is urged to roll along the interior wall of capsule 42, staying between the poles of magnet 44. The viscous fluid filling capsule 42 flows through the constriction between the sphere 84 and the interior wall of capsule 42, dissipating energy and providing damping between bar 15 and satellite vehicle 11. Damping assembly 25 similarly dissipates energy and prevents oscillations due to relative motion in the plane perpendicular to erecting bar 13 between damper bar 15 and damper bar 16. In a similar manner, damping assembly 31 serves to damp out relative motion between damper bar 16 and satellite vehicle 11 and rigidly attached erecting bar 13 in the plane of the orbit.

As disclosed hereinabove, primary erecting bar 13 and damper bars 15 and 16 are in the form of thin-walled tube of springy material, slit lengthwise. During the launching of the satellite vehicle 11, it will be apparent that the elongated erecting and stabilizing bars must be stored in a compact manner. Means must also be provided enabling deployment of the erecting and stabilizing bars upon attainment of the desired orbit by satellite vehicle 11.

Referring now to FIGURE 6, the storage and deploying means associated with primary erecting bar 13 comprises a reel 17 releasably connected to a bracket 21 by means of a piston and explosive squib assembly 85. During launch and injection into orbit, the slit tube is stored in flat, rolled condition on reel 17. Energy stored during the flattening and rolling procedure tends to unroll the tube. Upon reaching the desired orbit, squib assembly 85 is actuated, releasing reel 17 from bracket 21 and allowing flattened tube 13 to unroll. In order to limit the forces applied to reel 17 and tube 13 as the reel is accelerated during the unrolling, a governor is provided. Upon unreeling, the flattened, slit tube reassumes its tubular form, becoming substantially rigid and bar-like.

Flattened, slit tube 13 is stored in the rolled state on a spool 86, which rotates during deployment of tube 13.

A flanged retainer 87 having bearing arms 91 and a bearing 92 do not rotate with spool 86, serving to guide tube 13 as it deploys. A governor, comprising a plurality of brake shoes such as brake shoe 93, is fastened to the periphery of spool 86 by means of an elongated leaf spring 94. Leaf spring 94 is fastened to spool 86 at one end, and to brake shoe 93 at the other. As spool 86 rotates, centrifugal force urges brake shoe 93 into friction contact with brake drum 95, secured to retainer 87. As will be apparent, the rate of deployment is determined by the characteristics of the slit tube, and by the characteristics of the brake shoes, springs and drum of the governor. The empty spool and governor may conveniently be retained at the end of the tube, providing added mass.

Obviously, many modifications and variations of the present invention are possible in the light of the above teachings. It is therefore to be understood that the invention is to be limited only by the spirit and scope of the appended claims.

I claim:

1. A satellite vehicle orientation device comprising a satellite vehicle, a rigid, elongated tubular member having one end fastened to said satellite vehicle, a reel for storing said tubular member and means for deploying said tubular member.

2. A satellite vehicle orientation device comprising a satellite vehicle, an erecting elongated member having one end fastened to said satellite vehicle, a rigid elongated damper member pivotally connected to said satellite vehicle, and damping means connected to said damper member and said satellite vehicle.

3. A satellite vehicle orientation device comprising a satellite vehicle, an erecting member having one end rigidly fastened to said satellite vehicle, a damper member pivotally connected to said satellite vehicle, said erecting member and said damper member comprising rigid, elongated tubes, damping means connected to said damper member and said satellite vehicle, and means for storing and deploying said erecting member and said damper member.

4. A satellite vehicle orientation device comprising a satellite vehicle, an erecting member having one end rigidly fastened to said satellite vehicle, a damper member pivotally connected to said satellite vehicle, perpendicular to said erecting member, said erecting member and said damper member comprising rigid, elongated tubes, damping means connected to said damper member and said satellite vehicle, and means for storing and deploying said erecting member and said damper member.

5. A satellite vehicle orientation device comprising a satellite vehicle, an erecting member having one end rigidly fastened to said satellite vehicle, a first damper member pivotally connected to said satellite vehicle, perpendicular to said erecting member, a second damper member pivotally connected to said satellite vehicle perpendicular to said erecting member and said first damper member, said erecting member and said first and second damper members comprising rigid, elongated tubes, damping means connected to said first and second damper members and said satellite vehicle, and means for storing and deploying said erecting member and said first and second damper members.

6. A satellite vehicle orientation device comprising a satellite vehicle, an erecting member having one end rigidly fastened to said satellite vehicle, said erecting member comprising a rigid, elongated tube having a longitudinal slit, a reel for storing said erecting member in flat, rolled condition, and selectively releasable fastening means for securing said reel to said satellite vehicle.

7. A satellite vehicle orientation device comprising a satellite vehicle, first, second and third mutually perpendicular rigid elongated members, and means for fastening said rigid elongated members to said satellite vehicle.

8. A satellite vehicle orientation device comprising a satellite vehicle, an erecting elongated member connected to said satellite vehicle, first and second stabilizing elongated members fastened to said satellite vehicle, said erecting member and said first and second stablizing members being mutually perpendicular.

9. A satellite vehicle having a first elongated member normally parallel to the local vertical, a second elongated member normally parallel to the orbital plane and perpendicular to the local vertical and a third elongated member normally perpendicular to the local vertical and to the orbital plane, and means for storing and deploying said first, second and third members to said satellite vehicle.

References Cited by the Examiner

UNITED STATES PATENTS

| | | | |
|---|---|---|---|
| 2,835,548 | 5/58 | Baumann | 244—1 |
| 3,030,049 | 4/62 | Pilkington | 244—1 |
| 3,031,154 | 4/62 | Roberson | 244—1 |

OTHER REFERENCES

American Rocket Society Journal; "Stabilization and Attitude Control of Satellite Vehicles," December 1959, pages 927–930.

FERGUS S. MIDDLETON, Primary Examiner.

MILTON BUCHLER, RALPH D. BLAKESLEE, Examiners.